United States Patent
Brychell

(10) Patent No.: US 7,762,704 B2
(45) Date of Patent: Jul. 27, 2010

(54) OPTIMIZED DISTRIBUTION OF LIGHT EXTRACTION FROM AN EDGE LIT LIGHT SOURCE

(75) Inventor: Joseph Brychell, Ponte Vedra Beach, FL (US)

(73) Assignee: Bryter Technologies LLC, Ponte Vedra Beach, FL (US)

( * ) Notice: Subject to any disclaimer, the term of this patent is extended or adjusted under 35 U.S.C. 154(b) by 0 days.

(21) Appl. No.: 12/622,413

(22) Filed: Nov. 19, 2009

(65) Prior Publication Data

US 2010/0124074 A1    May 20, 2010

Related U.S. Application Data

(60) Provisional application No. 61/116,015, filed on Nov. 19, 2008.

(51) Int. Cl.
  *F21V 7/04* (2006.01)
(52) U.S. Cl. .............................. 362/615; 40/442; 385/31
(58) Field of Classification Search .................. 362/600, 362/604, 551
  See application file for complete search history.

(56) References Cited

U.S. PATENT DOCUMENTS

| | | | | |
|---|---|---|---|---|
| 3,000,774 | A | * 9/1961 | Swedlow et al. | ............ 362/605 |
| 5,407,711 | A | 4/1995 | Lovinson et al. | |
| 6,212,805 | B1 | 4/2001 | Hill | |
| 6,767,106 | B2 | * 7/2004 | Barnes et al. | ............... 362/600 |
| 6,776,484 | B2 | * 8/2004 | Tribuiani | .................... 351/153 |
| 7,362,468 | B2 | 4/2008 | Takahashi | |
| 2003/0174490 | A1 | 9/2003 | Allinson | |
| 2006/0062540 | A1 | 3/2006 | Zoorob et al. | |
| 2006/0115214 | A1 | 6/2006 | Cassarly | |
| 2006/0291241 | A1 | 12/2006 | Wojtowicz et al. | |
| 2007/0280593 | A1 | 12/2007 | Brychell et al. | |

FOREIGN PATENT DOCUMENTS

EP    1285198 B1    11/2006

OTHER PUBLICATIONS

WIPO PCT International Search Report for PCTIUS07/69447, International Publication No. WO 2007/137253 A3, Nov. 29, 2007.

* cited by examiner

*Primary Examiner*—Gunyoung T Lee
(74) *Attorney, Agent, or Firm*—Mark Young, P.A.

(57) ABSTRACT

An edge-lit panel features extractor patterns that produce uniform illumination. The effective density of extractor pattern pixels is adjusted to achieve uniform illumination. A method of adjusting the effective pixel density of extractor pattern pixels to achieve uniform illumination entails adjusting areas of darkness of a grayscale image, then producing a binary image by dithering the grayscale image, and applying an extractor pattern corresponding to the binary image to a surface of the panel. The extractor pixels correspond to pixels of the binary image derived from a dithered grayscale image, with the darkness of the grayscale image increasing with distance from the light source. Effective pixel density is increased to compensate for attenuated output in dim areas. By adjusting gray shading darkness of a grayscale image, pixel density can be adjusted to achieve uniform light emission. The extractor pixels may be applied using a radiation curable ink, which can be used in high speed inkjet printers that can achieve production speeds. The resulting print is waterproof, embossed and vibrant.

20 Claims, 8 Drawing Sheets

OPTIMIZED DISTRIBUTION OF LIGHT EXTRACTION FROM AN EDGE LIT LIGHT SOURCE

RELATED APPLICATION

This application claims the benefit of priority of U.S. Provisional Application No. 61/116,015, filed Nov. 19, 2009, the entire contents of which are incorporated herein and made a part hereof.

FIELD OF THE INVENTION

This invention generally relates to signage, and more particularly, to an edge lit panel and method of manufacturing an edge lit panel which optimizes distribution of light extracted from a light source.

BACKGROUND

Edge-lit displays, such as edge-lit signs, under-cabinet lighting, ceiling tile lighting, back light (as a replacement for fluorescent bulbs), generally comprise a light source and a treated light transmitting sheet. The light source illuminates one or more edges of the light transmitting sheet. The sheet is composed of internally light-reflective material such as glass or acrylic. Light that enters the sheet is internally reflected, only escaping where the surface has been treated. The treated area is referred to as an extraction pattern. The extraction pattern may be formed by any suitable means such as etching, sandblasting, engraving, molding in bas-relief, or writing with crayon. Properly implemented, wherever the normally smooth surface has been treated, the surface glows so that it appears to be the light source itself. The glowing areas may take the form of lettering, line drawings, or three-dimensional scenes by layering and applying the appropriate pattern. Various edge light sources may be used, such as neon or fluorescent tubes, light emitting diodes (LEDs), incandescent bulbs or the like.

A problem with conventional edge-lit panels is non-uniform light emission. As light propagates through the light transmitting sheet by total internal reflection, the light energy is attenuated such as by absorption, scattering and diffusion. In general, for a uniform homogeneous light transmitting sheet, these effects become more pronounced with increasing distance from the light source. These effects result in light of non-uniform intensity emitted from the extraction pattern formed on the surface of the sign. Such non-uniformity is manifested as brightly illuminated regions and poorly illuminated regions of the display. Consequently, conventional edge-lit signs are limited in size to approximately 8 to 12 inches in dimension from the light source.

What is needed is edge-lit panels with extractor patterns that produce uniform illumination. Also needed is a reliable and easy-to-use method for adjusting the density of extractor pattern pixels to achieve uniform illumination. The invention is directed to overcoming one or more of the problems and solving one or more of the needs as set forth above.

SUMMARY OF THE INVENTION

To solve one or more of the problems set forth above, an exemplary edge-lit panel is provided featuring an extractor pattern that produces uniform illumination for an image. A reliable and easy-to-use method for adjusting the density of extractor pattern pixels is also provided to achieve such uniform illumination.

An exemplary edge-lit sign according to principles of the invention includes a solid panel of optical transmission medium having a first surface, a second surface opposite the first surface, and a plurality of edges. The plurality of edges includes at least one illuminated edge and at least one unlit edge. Each unlit edge is coated with a coating that prevents light emission therefrom. A light source provided along the illuminated edge transmits light into the panel through the illuminated edge. An extractor pattern formed on the first surface or the second surface of the pane includes extractor pixels. The extractor pixels cause light transmitted in the panel to emit from the panel. The extractor pixels per unit area (extractor pixel density) vary with distance from the illuminated edge to achieve a substantially spatially uniform intensity of light emitted from the panel. The unlit edge may be coated with a reflective coating. The light source may be a fluorescent lamp, incandescent lamp, and light emitting diode. A reflective cover may be provided to reflect light emitted from the second surface back into the panel. Optionally, an image may be applied over the extractor pattern. Additionally, several layers of panels may be stacked to achieve a 3D effect.

Each extractor pixel includes an area of surface roughness, such as a recess or protrusion, or an ink coated area on a surface. A UV-curable ink applied by a flatbed printer is preferred. The ink coated area causes light to emit from an area of the surface opposite surface on which the ink coated area is applied. The ink coated area may include a grayscale image, preferably a dithered grayscale image, using a dithering algorithm such as Floyd-Steinberg, Jarvis, Judice, Ninke, Stucki, or Burkes dithering.

Thus, the extractor pattern is comprised of pixels that correspond to a grayscale image. The grayscale image features darker areas as distance increases from the light source. The grayscale image is dithered using a dithering algorithm. Dithering turns each shade of gray into a pattern of black and white pixels that, from a distance, look about the same as the gray. Such pattern is referred to as pixelated because individual pixels may be seen on close inspection, but not from a distance. The result is an image with discrete binary elements and/or elements in shades of gray. If the dithered image contains any gray shades, then the dithered image is converted to black and white, i.e., binary. The binary image exhibits greater pixel density in the areas that corresponded to the darker grayscale areas. The binary image is then applied to the panel to form the extractor pattern. Thus, the extractor pixels correspond to pixels of a binary image derived from a dithered grayscale image, with the darkness of the grayscale image increasing with distance from the light source. By adjusting gray shading darkness of a grayscale image, pixel density can be adjusted to achieve uniform light emission.

The extractor pattern may include a plurality of zones, including a first zone and a second zone. The first zone is closer than the second zone to the illuminated edge. The extractor pixels per unit area in the second zone may be greater than the extractor pixels per unit area in the first zone to compensate for attenuation and achieve a substantially spatially uniform intensity of light emitted from the panel.

A method for determining the density of extractor pattern pixels in an edge-lit sign to achieve uniform illumination entails providing a panel having an illuminating edge through which light can be transmitted. A plurality of zones is defined on the panel, including a first zone and a second zone, the first zone is closer than the second zone to an illuminating edge of the panel. A reference area is defined in each zone. Within each reference area, at least one reference extractor pixel is formed using the same formation technique and parameters for each reference extractor pixel. Light is transmitted into the panel through the illuminating edge. The intensity of light emitted from each reference extractor pixel is compared. If the intensity of light emitted from each reference extractor pixel is not substantially the same, then the pixel density in the second zone is increased until the intensity of light emitted from the reference extractor pixel in the first zone and second is substantially the same. The step of comparing the intensity of light emitted from each reference extractor pixel may entail determining an adjustment factor based upon the ratio of compared intensity of light emitted from the reference extractor pixel in the first zone to the intensity of light emitted from the reference extractor pixel in the second zone. The step of increasing the pixel density in the second zone until the intensity of light emitted from the reference extractor pixel in the first zone and second is substantially the same, may include increasing the pixel density in the second zone by the adjustment factor. The step of increasing the pixel density in the second zone until the intensity of light emitted from the reference extractor pixel in the first zone and second is substantially the same, may include forming at least one additional reference extractor pixel in the reference area of the second zone.

BRIEF DESCRIPTION OF THE DRAWINGS

The foregoing and other aspects, objects, features and advantages of the invention will become better understood with reference to the following description, appended claims, and accompanying drawings, where:

Those skilled in the art will appreciate that the figures are not intended to be drawn to any particular scale; nor are the figures intended to illustrate every embodiment of the invention. The invention is not limited to the exemplary embodiments depicted in the figures or the specific components, shapes, relative sizes, ornamental aspects or proportions shown in the figures.

DETAILED DESCRIPTION

Figure 1:
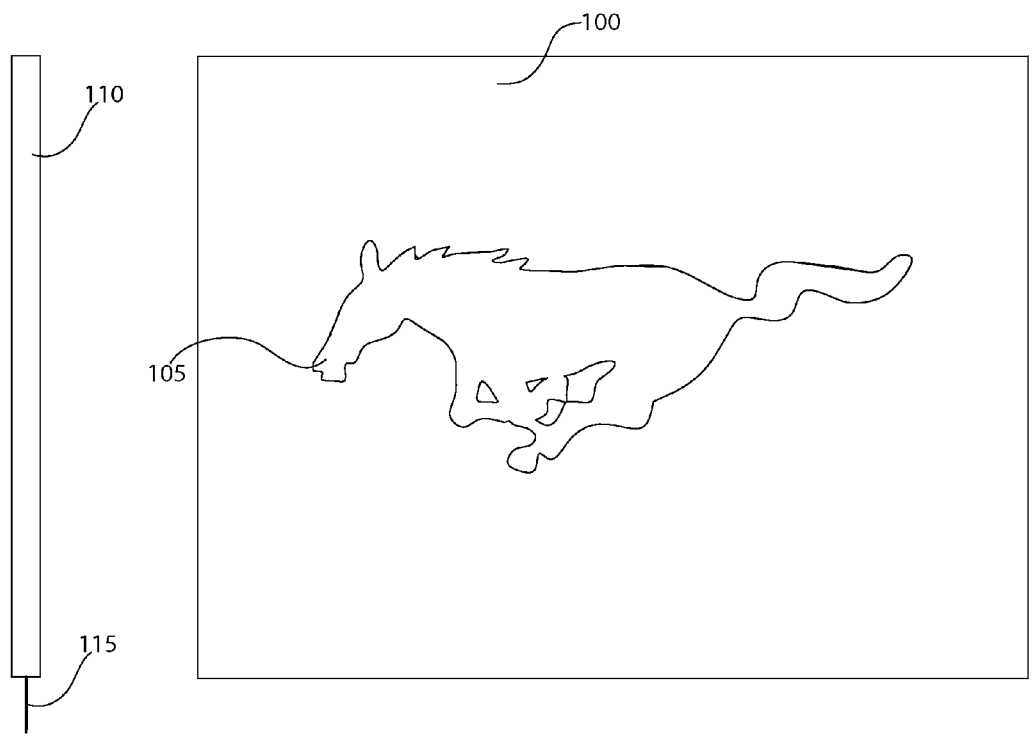
FIG. 1 shows a plan view of an exemplary edge-lit panel in accordance with principles of the invention.
Figure 2:
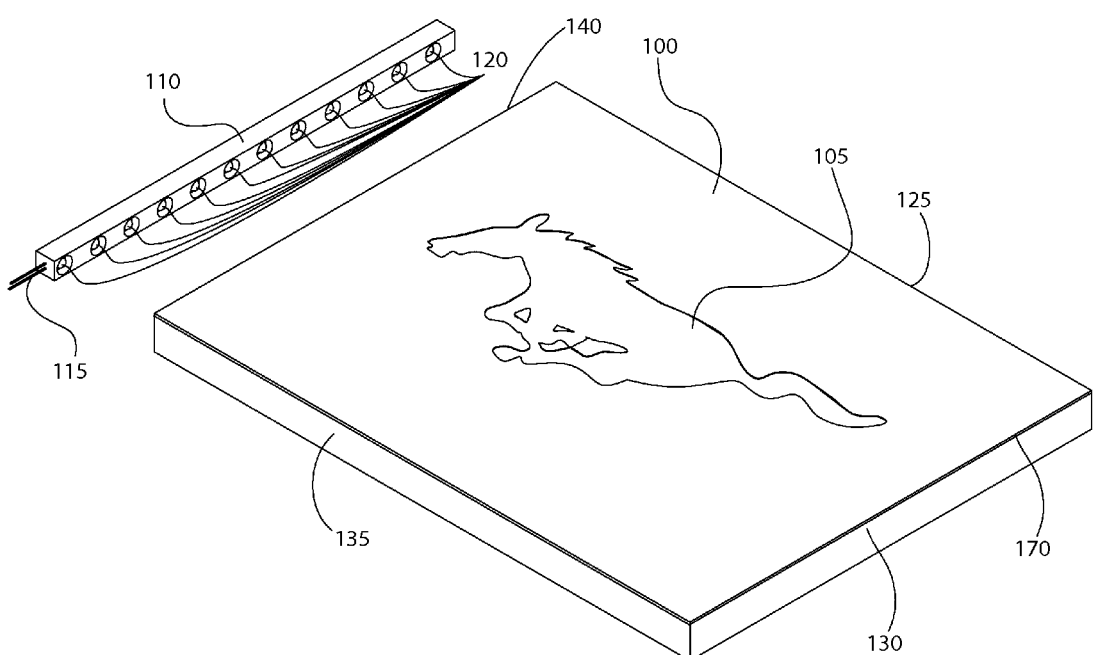
FIG. 2 shows a perspective view of an exemplary edge-lit panel in accordance with principles of the invention.

Referring to the Figures, in which like parts are indicated with the same reference numerals, various views of exemplary edge-lit panel assemblies according to principles of the invention are shown. With particular reference to FIGS. 1 and 2, an exemplary edge-lit sign 100 comprises a panel of optical transmission medium such as glass, plastic (e.g., acrylic), polymethylmethacrylate or any other material suitable for an edge lit sign. In example embodiments, the panel comprises a material having a higher index of refraction than other surrounding materials, such that light is guided within the panel 100 by total internal reflection. Preferably the material is scratch resistant, such as hard (scratch resistant) acrylic. A vinyl layer may be applied to one or more surfaces (e.g., the face) of the panel for scratch resistance. The unlit panel edges 125, 130, 135 may be coated with a reflecting (or absorbing) layer to reduce the amount of light that escapes from the edges. The reflecting layers may be formed by a reflecting coating or film. The sign panel 100 is configured to receive and propagate light generated by a light source 110. Optionally, the back side of the panel 100 may be coated with a reflecting (i.e., light reflecting) layer to reflect or scatter light toward the front output surface.

A light source 110 provided along at least one edge 140 transmits light into an edge of the panel 100. The light source 110 may comprise one or more light generating means, such as fluorescent lamps, incandescent lamps, light emitting diodes (e.g., an LED array), laser diodes or any other light emitting devices suitable for uniformly transmitting light through the edge of the panel 100. The light source 110 may be configured to generate multi-chromatic light (e.g., white light) and/or monochromatic light (e.g., red, green and blue light) at one or more wavelengths. White light or green light are preferred. By way of example and not limitation, the light source may comprise an array of light emitting diodes 120. Optionally, a reflector positioned in the light source assembly may redirect, towards the lit 140 edge, any light emitted by the light generating means away from the lit edge. The light source assembly 110 can be physically coupled to panel 100 with brackets or glue or any other suitable coupling device.

Electrodes 115 are provided for coupling the light source to a suitable power supply. The power supply (not shown) can be any suitable battery pack, wall adapter, or the like, as is well understood by anyone skilled in the art. As is also well understood in the art, control and power regulation components and circuitry (also not shown) may be provided to manage activation and operation of the light source and to regulate the voltage and/or current of the supplied power. Such control and power regulation components and circuitry are well known in the art.

The "extractor pattern" 105 is an area of "extractor pixels." Extractor pixels are small discrete features formed on the surface of the panel 100 and used to cause light to be emitted from the surface of the panel 100. The pixel size determines the resolution. The extractor pattern 105 may be formed on a portion, majority or entirety of the surface of the panel 100.

Illustratively, in one embodiment, the extractor pixels may comprise a region of surface roughness composed of an array of raised features (such as a pattern of protrusions or ridges) or recessed features (such as a pattern of dimples or grooves). In another embodiment, localized material differences or other surface and/or volume perturbations may function as extractor pixels. Such features may be applied to the front surface (i.e., light emitting surface) of the panel, allowing light to escape through the pixels. An image layer 170, including indicia, such as one or more graphical representations (e.g., the silhouette of a mustang as shown in FIG. 2) and/or alphanumeric information, is applied on a surface of the panel 100 having an extractor pattern 105. The image layer 170 is applied over the extractor pattern 105.

In yet another embodiment, the extractor pixels comprise paint, ink or dye printed on the back surface of the panel. In such case, the extractor pixels allow light propagating within the panel to escape through the front surface of the panel by processes of refraction (e.g., bending), reflection, diffraction, and/or scattering. The light emitted through the front surface corresponds to the image printed on the back surface, which comprises extractor pixels. The extractor pattern 105 may cover an entire surface of a panel, or only portions of a surface. In this embodiment, a printed image (e.g., UV cured ink image) serves as the extractor pixels 105.

The amount of light output through each extractor pixel may vary between a maximum and a minimum amount. This may be accomplished, for example, by varying the physical characteristics such as height, depth or shape of the extractor pixels. In the case of pixels formed by inks, paints and dyes, the light output may be adjusted by varying composition of the inks, paints and dyes.

A pixel density is a number of pixels per unit surface area of the panel 100. The greater the density, the more pixels emitting light from the area. Consequently, by controlling the pixel density, one can control the intensity of light emitted from an area.

An effective pixel density is the light emitting capacity per unit area. The effective pixel density may be increased by increasing pixel density and/or the amount of light output through each extractor pixel. Conversely, the effective pixel density may be decreased by decreasing pixel density and/or the amount of light output through each extractor pixel. Thus, two areas having the same number of pixels may have different effective pixel densities due to different light emitting capacity of the respective pixels.

For convenience of reference, the effective pixel density may be expressed in pixels per unit area, such as, but not limited to, pixels per square inch (ppi). A reference pixel at a determined location on a panel may be used to define the light emitted from a reference pixel using a given light source. Thus, an area with each pixel configured to emit twice as much light may as the reference pixel, may be assigned an effective pixel density that is twice that of another area in the same location that has the same pixel density but half the light emitting capacity.

Extractor pixels may be applied to a surface of the panel 100 using any suitable technique include laminating, layering, coating, depositing, molding, roughening, etching (e.g., mechanical, chemical or laser etching) or carving. However, several of these techniques are time consuming, require special substrates, and leave opaque films or other distorting features on one or more surfaces. Nevertheless, the invention is not limited to any particular technique for forming extractor pixels. Indeed, any technique for forming extractor pixels, now known or hereafter developed, may be utilized in accordance with the principles of the invention.

A plurality of extractor pixels are applied to one (i.e., the front or back) surface or both (i.e., the front and back) surfaces of the panel 100. Light from the light source 100 propagating within the panel 100 is directed out of the panel 100 by the extractor pixels. The display pattern viewed at the output of the panel 100 is defined by the arrangement and distribution of the extractor pixels.

Optionally, an image 170 may be applied over the extractor pattern 105 using any compatible image application method. For example, the image 170 may be printed, painted, silk screened or overlaid on the extractor pattern 105. The image 170 may block (e.g., absorb or reflect) some light, filter some light to allow light of certain wavelengths to pass through, and/or allow light to pass through virtually unimpeded.

In some cases, light may propagate out through printed regions on the back surface. To recycle such light, a mirror or reflective panel or film is provided on, against and adjacent to the back surface. The mirror or reflective panel reflects light back into the panel, where it can be emitted though the front surface at regions corresponding to extractor patterns.

In a preferred embodiment, a UV curable flat bed printer is used to create an image from a pattern of extractor pixels comprising UV-cured ink. The medium or substrate to receive the printed image rests on a horizontally extending flat table or bed. An inkjet print head is mounted on a movable carriage or other type of mechanism that enables the print head to be moved along two mutually perpendicular paths across the bed. The print head is connected to a computer that is programmed to energize certain nozzles of the print head as the print head traverses across the substrate, optionally using inks of different colors. The ink on the substrate is then cured as needed to provide the desired final image. Radiation curing dries the ink quickly without the need to drive off large quantities of water or solvent. As a result, the radiation curable ink can be used in high speed inkjet printers that can achieve production speeds. The resulting print is waterproof, embossed and vibrant. Additionally, UV-curable printing allows full color (e.g., RGB or CMYK), enables high resolution printing, can be applied to a wide range of substrates, and produces a very robust image.

In a particular preferred embodiment, a grayscale image is generated, e.g., on a computer. Grayscale images are distinct from one-bit black-and-white images, which in the context of computer imaging are images with only the two colors, black, and white (also called bilevel or binary images). Grayscale images have many shades of gray in between. The intensity of a pixel may be expressed within a given range, such as between a minimum and a maximum, inclusive. A range may be represented in an abstract way as a range from 0 (total absence, black, darkest) and 1 (total presence, white, least dark), or vice versa, with any fractional values in between. Alternatively, a scale from 0% to 100% may be used. The particular scale and gradations are not particularly important.

When creating a grayscale image for a sign, lighter shades will be used closer to the light source. The image will be darker away from the light source. This is because the darker shades reflect more light than the lighter shades. A dithering algorithm is then applied to the grayscale image to manage the pixel density and control the intensity of light at various parts of the image. Exemplary dithering algorithms include, but are not limited to, Floyd-Steinberg dithering, Jarvis, Judice, Ninke, Stucki, or Burkes. Dithering turns each shade of gray into a pattern of black and white pixels that, from a distance, look about the same as the gray. The resulting image is a relatively grainy (pixilated) rendition of the original grayscale. Then, if the pixels contain any gray shading, the dithered gray scale image is converted into binary (i.e., black and white). The density of black pixels will be greater in the areas that correspond to darker gray. The light areas will have a lower pixel density. Optionally, the pixel density may then be further adjusted to achieve an even distribution of emitted light. Next, if color is desired, it may be added, typically sparingly and as an outline. This grainy black and white rendition with any added color is sent to the UV-curable flatbed printer for printing on the back surface of the substrate. The printed image reflects light through the opposite side of the sign. Thus, the extractor pixels correspond to pixels of a binary image derived from a dithered grayscale image, the darkness of the grayscale image increasing with distance from the light source.

Another way to convert a grayscale image to a binary image is thresholding. Thresholding is simply replacing each grayscale pixel with a black or white pixel depending on whether its brightness is above or below a threshold. That threshold might vary. As used herein, thresholding is a simple type of dithering.

Figure 3:
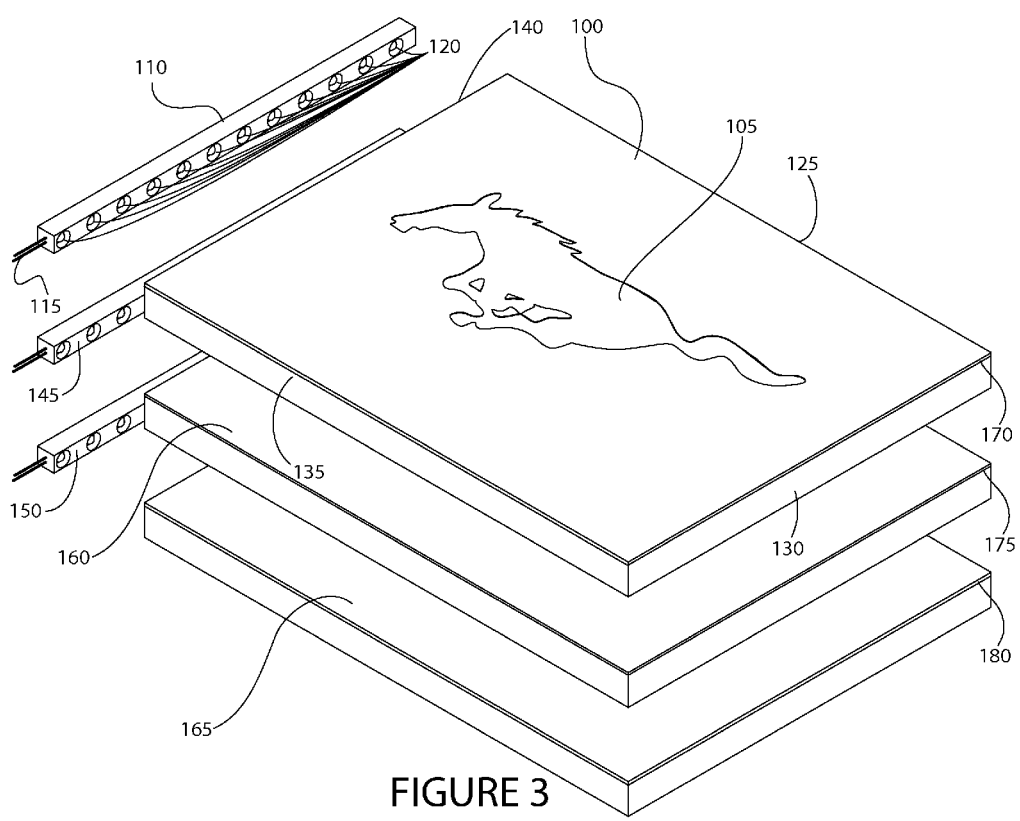
FIG. 3 shows a perspective view of an exemplary multi-layer edge-lit panel in accordance with principles of the invention.

Referring now to FIG. 3, an embodiment comprising a laminate is shown. A light source 100, 145, 150 is associated with each of a plurality of panels 100, 160, 165 and corresponding image layers 170, 175, 180. The stacked arrangement enables special display effects, including (but not limited to) three-dimensional effects with a unique extractor pattern 105 visible at each layer, animation effects with each layer sequentially illuminated to reveal a spatially progressive sequence of related images, and coloring effects by combining colors of overlaid images and varying illumination of the layers.

To compensate for diminishing light intensity with distance from a light source, the effective pixel density may be adjusted. Thus, for example, effective pixel density may be increased in regions that would otherwise appear "dim" and/or effective pixel density may be decreased in regions that would otherwise appear "bright." Effective pixel density may be increased by increasing the number of extractor pixels per unit area and/or by increasing the light output from pixels in the area. Effective pixel density may be decreased by decreasing the number of extractor pixels per unit area and/or by decreasing the light output from pixels in the area. In regions where the image resolution does not allow an increase of pixel density, the effective pixel density may be increased by increasing the amount of light emitted through each extractor pixel. Likewise, the effective pixel density may be decreased by decreasing the amount of light emitted through each extractor pixel.

Figure 4A:
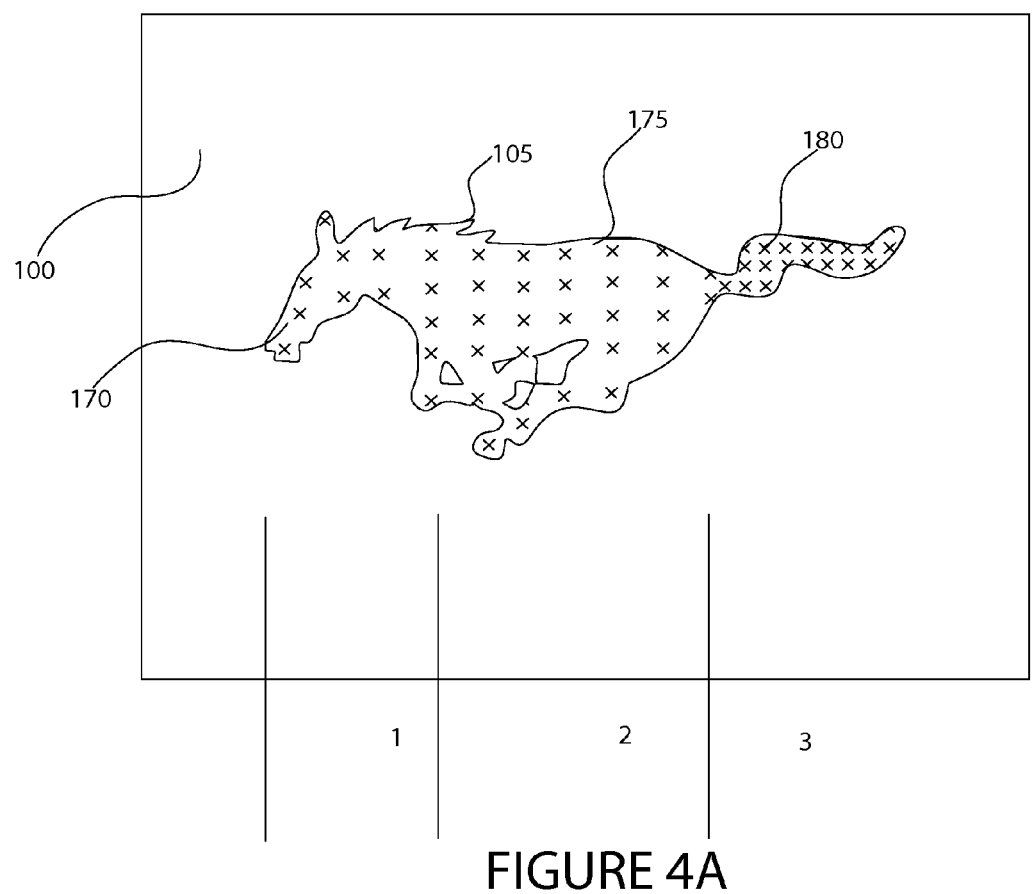
FIG. 4A shows a plan view of an exemplary edge-lit panel with markings to conceptually illustrate variable pixel density in accordance with principles of the invention.

FIG. 4A conceptually illustrates a panel 100 with a logo 170 comprised of extractor pixels that are spatially distributed non-uniformly. The logo 170 is conceptually divided into a plurality of zones 1, 2 and 3. Although three zones are shown, the principles of the invention are not limited to three zones and may be applied to panels featuring any number of zones. To compensate for dimming with distance from the light source, zone 1, being closest to the light source, the effective pixel density in zone 3 is greater than that of zone 2, which is greater than that of zone 1. The increased effective pixel density is conceptually illustrated by a greater number of Xs per unit area. The variable effective pixel density provides a technique for spatially manipulating light emitted from an area. Effective pixel density of zones 2 and 3 may be increased by increasing the number of extractor pixels per unit area and/or by increasing the light output from pixels in the area. Thus, the perceived intensity of light emitted from the nose of the mustang logo may be substantially similar to the perceived intensity of light emitted from the tail of the mustang. Furthermore, the perceived intensity of light emitted from the nose to tail of the mustang logo may be substantially uniform.

Figure 4B:
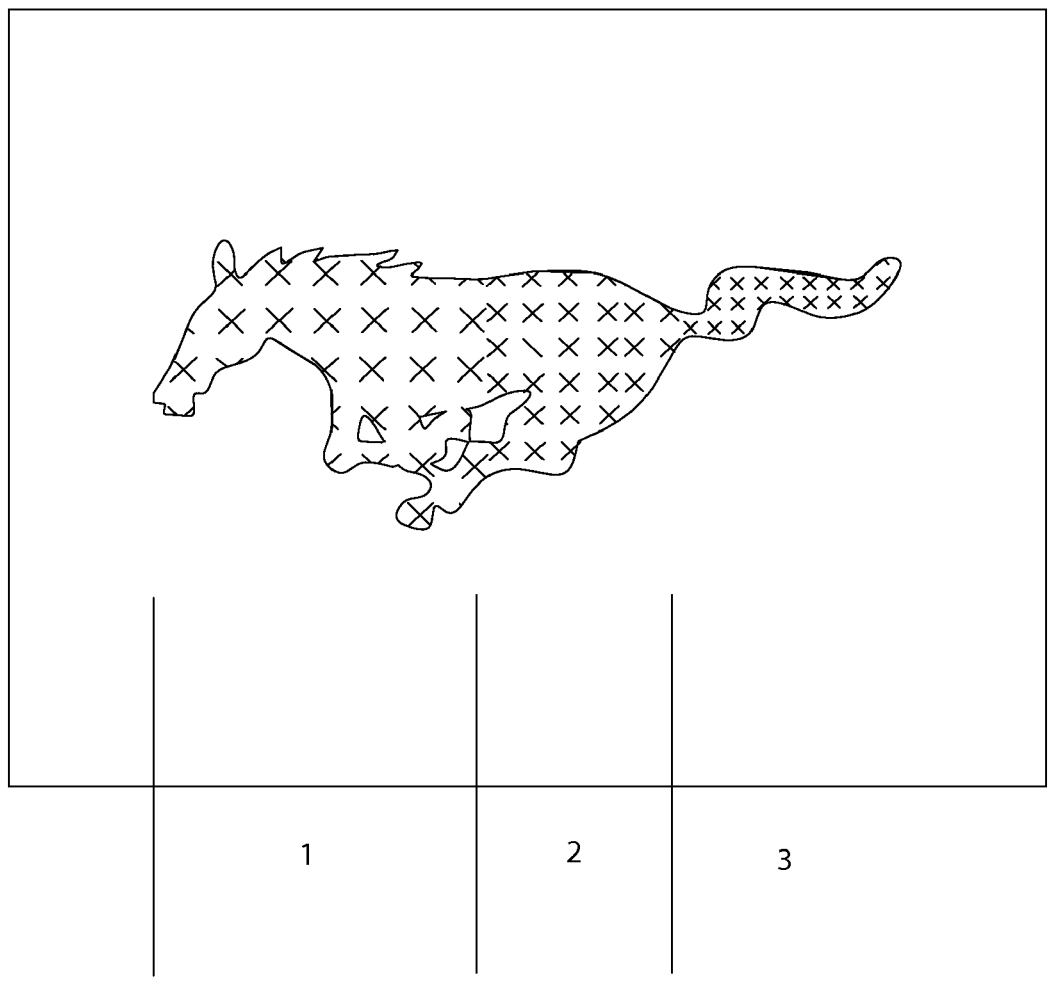
FIG. 4B shows another plan view of an exemplary edge-lit panel with markings to conceptually illustrate variable pixel density in accordance with principles of the invention.

Likewise, FIG. 4B conceptually illustrates a panel 100 with a logo 170 comprised of extractor pixels that are vary in size spatially, with smaller, more densely packed pixels as distance increases from the lit edge. Again, the logo 170 is conceptually divided into a plurality of zones 1, 2 and 3. Although three zones are shown, the principles of the invention are not limited to three zones and may be applied to panels featuring any number of zones. To compensate for dimming with distance from the light source, zone 1, being closest to the light source, the effective pixel density in zone 3 is greater than that of zone 2, which is greater than that of zone 1. The increased effective pixel density is conceptually illustrated by a greater number of Xs per unit area and is achieved by packing smaller pixels into an area. The variable effective pixel density provides a technique for spatially manipulating light emitted from an area. Effective pixel density of zones 2 and 3 may be increased by increasing the number of extractor pixels per unit area and/or by increasing the light output from pixels in the area. Thus, the perceived intensity of light emitted from the nose of the mustang logo may be substantially similar to the perceived intensity of light emitted from the tail of the mustang. Furthermore, the perceived intensity of light emitted from the nose to tail of the mustang logo may be substantially uniform.

Figure 5:
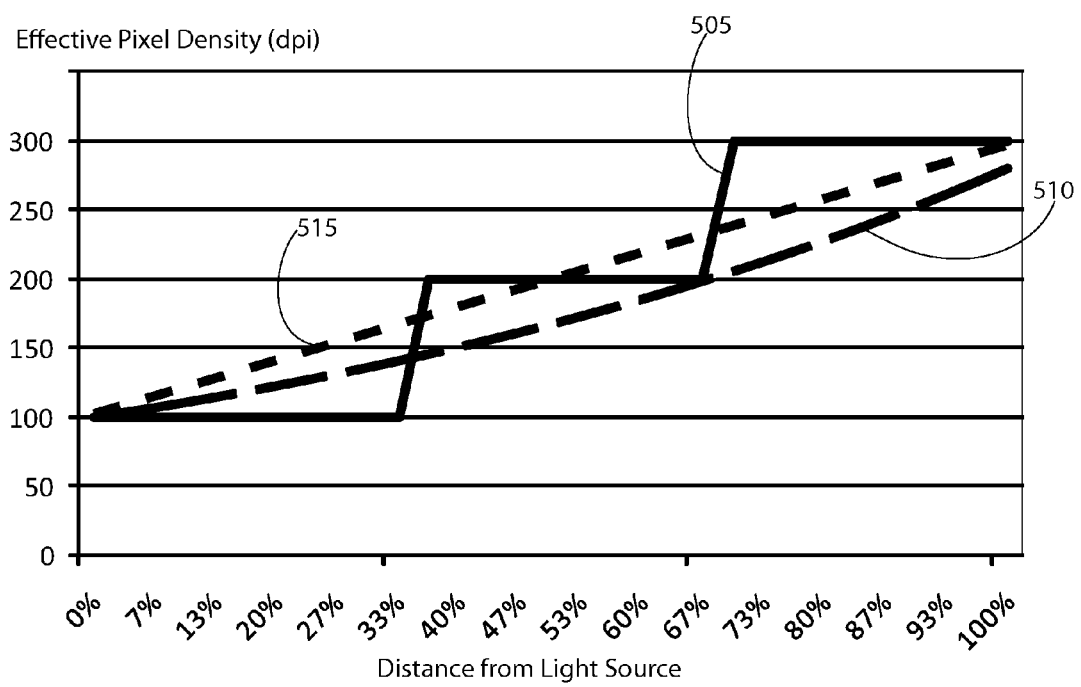
FIG. 5 shows a an exemplary graph with an ordinate showing variable pixel density and an abscissa showing distance of a pixel, as a percentage of total length, from a lit edge of an edge-lit panel in accordance with principles of the invention.

A graph conceptually illustrating variation of effective pixel density with distance is shown in FIG. 5. Distance is measured from the light source edge and is shown as a percentage of total length. The effective pixel density may vary (i.e., increase) in steps 505, with a gradual yet varying rate of increase (i.e., slope) 510, linearly 515 or in some other manner to achieve an apparent spatially uniform light intensity output. The increase in pixel density corresponds to increasing darkness of the grayscale image described above.

As used herein, a display with an apparent spatially uniform light intensity output refers to a display without unintended bright or dim spots that are readily observable to the naked eye. Achieving such a display is an objective of the invention.

Methods for adjusting the density of extractor pattern 105 pixels in an edge-lit sign to achieve uniform illumination in accordance with principle of the invention include trial and error or iteration, empirical determination, and computation. Trial and error or iteration entails observing and modifying effective pixel density by spatially varying darkness of areas of a grayscale image used to form an extractor pattern 105 until a desired measure of uniformity is achieved. Empirical methods may entail applying effective pixel densities by applying spatially varied darkness of areas of a grayscale image from completed prior experiments. The experiments may cover a range of extractor pattern 105 sizes and shapes, a range of panel sizes and materials, a range of pixel formations, and a range of light source configurations. Computation entails determining or estimating the ratio of light output from a dim or bright region to the light output from a properly lit region. The effective pixel density of the dim or bright region may then be adjusted according to the ratio by adjusting the darkness of the corresponding areas of the grayscale image accordingly. Illustratively, if a dim area emits half the light of a properly lit area, then the effective pixel density of the dim area may be doubled to compensate, which may mean the grayscale darkness may be about twice that of the dim area.

Figure 6:
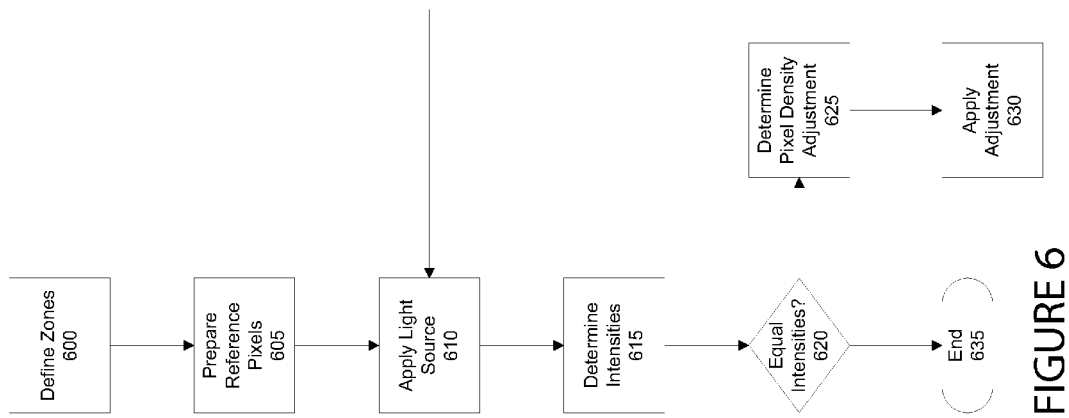
FIG. 6 is a flow chart that shows steps of a method for adjusting the density of extractor pattern 105 pixels in an edge-lit panel to achieve uniform illumination in accordance with principles of the invention.
Figure 7:
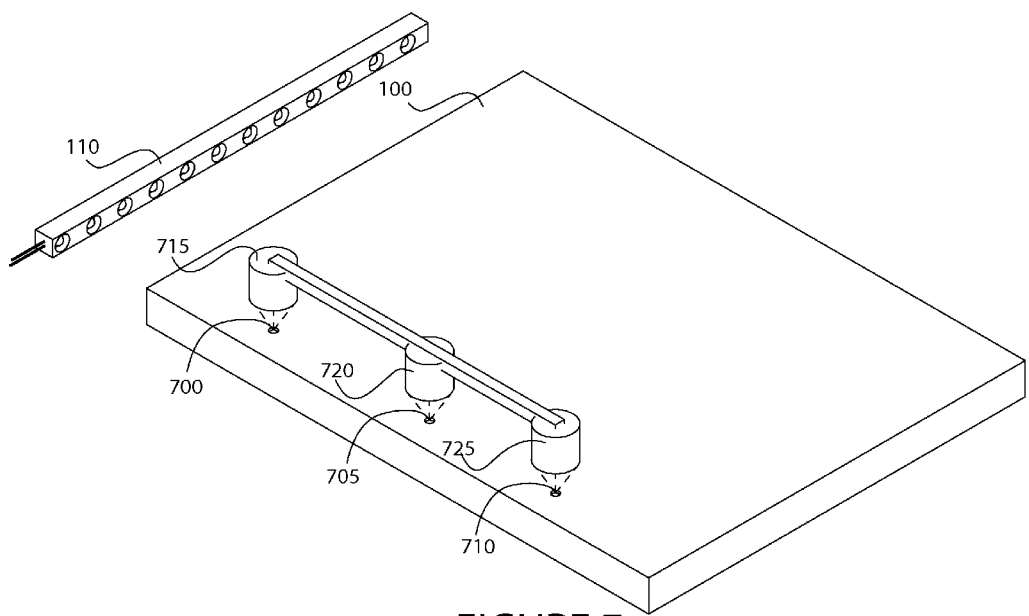
FIG. 7 is a schematic illustrating a configuration for adjusting the density of extractor pattern pixels in an edge-lit panel to achieve uniform illumination in accordance with principles of the invention.

Referring now to FIG. 6, a high-level flow chart that shows steps of a method for adjusting the density of extractor pattern 105 pixels in an edge-lit sign to achieve uniform illumination in accordance with principles of the invention is provided. However, the invention is not limited to this particular method. In step 600, zones are defined in the extractor pattern 105. For example, the panel 100 or extractor pattern 105 may be divided into two, three or more equal or unequal contiguous sections, such as the three zones shown in FIG. 4. A reference area with one or more (i.e., an equal number of) reference pixels may be formed in each zone, in accordance with step 605. Illustratively, a ½ inch² circular area 700, 705, 710 along the bottom edge of each zone may serve as reference areas, as conceptually illustrated in FIG. 7. Within each reference area 700, 705, 710, one or more pixels are formed using the same formation technique and parameters for each pixel. Next, the light source 110 is applied to the lit edge as in step 610. Upon applying the light source, each reference area 700, 705, 710 will emit light. Next, the intensity of light emitted from each area is determined, either qualitatively or quantitatively, as in step 615. A qualitative determination may entail a subjective assessment of brightness (e.g., brightness estimated on a scale of 1 to 10 or brightness according to "too bright," "too dim" or "correct" criteria). A quantitative determination may entail measuring output from each reference area using a photosensor, such as a photodiode, phototransistor, photoresistor or other sensing device capable of producing an output signal corresponding to the received light. Next, the light intensities from each reference area 700, 705, 710 are compared as in step 620. For example, the intensity of light from the first area 700 may be compared to the intensity of light from the second area 705. Likewise, the intensity of light from the second area 705 may be compared to the intensity of light from the third area 710. If the sensed intensities are equal or within an allowable deviation, then no adjustment may be necessary. However, if the sensed intensities are appreciably different, then an adjustment factor is determined for adjusting effective pixel density, as in step 625. The adjustment factor may be based upon the ratio of compared intensities. Thus, for example, if the intensity of the first area 700 is twice that of the second area 705, then the effective pixel density may transition from first density in the first zone to a second density in the second zone, with the second density being double the first density. This may be accomplished by adjusting the darkness of grayscale images, dithering the images and thereby converting the dithered images to binary, and applying the binary images to the panel. The grayscale variation in darkness results in a variation in pixel density. Likewise, if the intensity of the second area 705 is twice that of the third area 710, then the effective pixel density, via grayscale darkness, may transition from second density in the second zone to a third density in the third zone, with the third density being double the first density. Thus, the extractor pixels correspond to pixels of a binary image derived from a dithered grayscale image, with the darkness of the grayscale image generally increasing with distance from the light source and being adjustable to achieve a desired sharpness and uniformity of intensity of emitted light. These correction factors are applied in step 630. While certain example configurations of extractor pixels and methods of adjusting effective pixel density are described herein, the principles of the invention are not limited to the examples.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. An edge-lit sign comprising
a solid panel of optical transmission medium having a first surface, a second surface opposite the first surface, and a plurality of edges;
the plurality of edges including at least one illuminated edge and at least one unlit edge;
each of the at least one unlit edge being coated with a coating that prevents light emission therefrom;
a light source provided along the at least one illuminated edge, said light source transmitting light into the panel through the at least one illuminated edge;
an extractor pattern formed on at least one of the first surface or the second surface of the panel, said extractor pattern comprising extractor pixels, said extractor pixels causing light transmitted in the panel to emit from the panel; the extractor pixels per unit area varying with distance from the at least one illuminated edge to achieve a substantially spatially uniform intensity of light emitted from the panel; the extractor pixels corresponding to pixels of a binary image derived from a dithered grayscale image, the darkness of the grayscale image increasing with distance from the light source.

2. An edge-lit sign according to claim 1, said at least one unlit edge being coated with a reflective coating.

3. An edge-lit sign according to claim 1, said light source comprising a light generator from the group consisting of a fluorescent lamp, incandescent lamp, and light emitting diode.

4. An edge-lit sign according to claim 1, each extractor pixel comprising an area of surface roughness.

5. An edge-lit sign according to claim 1, each extractor pixel comprising a recessed area.

6. An edge-lit sign according to claim 1, each extractor pixel comprising a protruding area.

7. An edge-lit sign according to claim 1, each extractor pixel comprising an ink coated area on the second surface, said ink coated area causing light to emit from an area of the first surface opposite the ink coated area.

8. An edge-lit sign according to claim 1, each extractor pixel comprising a radiation-cured ink coated area on the second surface, said ink coated area causing light to emit from an area of the first surface opposite the ink coated area.

9. An edge-lit sign according to claim 1, each extractor pixel comprising a radiation-cured ink coated area on the second surface, said ink coated area causing light to emit from an area of the first surface opposite the ink coated area, said ink coated area comprising a binary image.

10. An edge-lit sign according to claim 1, each extractor pixel comprising a radiation-cured ink coated area on the second surface, said ink coated area causing light to emit from an area of the first surface opposite the ink coated area, said ink coated area comprising a binary pixelated image.

11. An edge-lit sign according to claim 1, each extractor pixel comprising a radiation-cured ink coated area on the second surface, said ink coated area causing light to emit from an area of the first surface opposite the ink coated area, said ink coated area comprising a binary image derived from a dithered grayscale image.

12. An edge-lit sign according to claim 1, each extractor pixel comprising a radiation-cured ink coated area on the second surface, said ink coated area causing light to emit from an area of the first surface opposite the ink coated area, said ink coated area comprising a binary image derived from a dithered grayscale image and colored portions.

13. An edge-lit sign according to claim 1, each extractor pixel comprising a radiation-cured ink coated area on the second surface, said ink coated area causing light to emit from an area of the first surface opposite the ink coated area, said ink coated area comprising a dithered grayscale image, said dithered grayscale image produced using a dithering algorithm from the group consisting of a Floyd-Steinberg, Jarvis, Judice, Ninke, Stucki, and Burkes dithering.

14. An edge-lit sign according to claim 1, further comprising a reflective cover disposed over the second surface of the panel, said reflective cover reflecting light emitted from the second surface back into the panel.

15. An edge-lit sign according to claim 1, further comprising an image applied over the extractor pattern.

16. An edge-lit sign according to claim 1,
said solid panel of optical transmission medium being a first solid panel of optical transmission medium;
said edge-lit sign further comprising a second solid panel of optical transmission medium having a first surface, a second surface opposite the first surface, and a plurality of edges;
the second solid panel of optical transmission medium being coextensive with and parallel to the solid panel of optical transmission medium;
the plurality of edges of the second solid panel including at least one illuminated edge and at least one unlit edge;
each of the at least one unlit edge of the second solid panel being coated with a coating that prevents light emission therefrom;
a light source provided along the at least one illuminated edge of the second solid panel, said light source transmitting light into the second panel through the at least one illuminated edge;
an extractor pattern formed on at least one of the front surface or back surface of the second panel, said extractor pattern comprising extractor pixels, said extractor pixels causing light transmitted in the second panel to emit from the second panel into the first panel; the extractor pixels per unit area varying with distance from the at least one illuminated edge to achieve a substantially spatially uniform intensity of light emitted from the panel.

17. An edge-lit sign according to claim 1
the extractor pattern including a plurality of zones, including a first zone and a second zone, the first zone being closer than the second zone to the at least one illuminated edge; and
the extractor pixels per unit area in the second zone being greater than the extractor pixels per unit area in the first zone.

18. A method for forming an edge-lit sign comprising
providing a solid panel of optical transmission medium having a first surface, a second surface opposite the first surface, and a plurality of edges, the plurality of edges including at least one illuminated edge and at least one unlit edge, and each of the at least one unlit edge being coated with a coating that prevents light emission therefrom;
forming an extractor pattern on at least one of the first surface or the second surface of the panel, said extractor pattern comprising extractor pixels, said extractor pixels causing light transmitted in the panel to emit from the panel, the extractor pixels per unit area varying with distance from the at least one illuminated edge to achieve a substantially spatially uniform intensity of light emitted from the panel,
said step of forming an extractor pattern further comprising forming a grayscale image for the extractor pattern, with gray shading of the grayscale image increasing in darkness with increasing distance from the at least one illuminated edge, generating a binary image by dithering the grayscale image, and forming the extractor pattern on the at least one of the first surface or the second surface of the panel from the binary image.

19. A method for forming an edge-lit sign according to claim 18,
wherein the step of forming the extractor pattern on the at least one of the first surface or the second surface of the panel from the binary image includes printing the binary image on the at least one of the first surface or the second surface of the panel.

20. A method for forming an edge-lit sign according to claim 18,
wherein the step of forming the extractor pattern on the at least one of the first surface or the second surface of the panel from the binary image includes printing the binary image on the at least one of the first surface or the second surface of the panel using radiation curable ink.

* * * * *